United States Patent [19]

Gibbs

[11] 4,333,659
[45] Jun. 8, 1982

[54] TURBOCHARGER SHAFT SEAL ARRANGEMENT

[75] Inventor: Craig A. Gibbs, Stanton, Calif.

[73] Assignee: The Garrett Corporation, Los Angeles, Calif.

[21] Appl. No.: 172,870

[22] Filed: Jul. 28, 1980

[51] Int. Cl.³ .............................................. F16J 15/40
[52] U.S. Cl. ......................................... 277/1; 277/67
[58] Field of Search ............. 277/81 R, 83, 91, 93 A, 277/133, 134, 168, 173, 175, 178, 67, 1

[56] References Cited

U.S. PATENT DOCUMENTS

| | | |
|---|---|---|
| 1,211,166 | 1/1917 | Keating . |
| 1,463,018 | 7/1923 | Junggren . |
| 1,900,849 | 3/1933 | Ackerman . |
| 2,418,185 | 4/1947 | McConaghy ................. 277/81 X |
| 2,890,069 | 6/1959 | Larkin et al. . |
| 2,891,808 | 6/1959 | Richardson ...................... 277/67 |
| 2,910,328 | 10/1959 | Frolich . |
| 3,004,782 | 10/1961 | Meermans . |
| 3,053,541 | 9/1962 | Dega . |
| 3,154,309 | 10/1964 | Voitik ......................... 277/175 X |
| 3,494,679 | 2/1970 | Burdette . |
| 3,519,277 | 7/1970 | Crocker ........................... 277/67 |
| 3,565,497 | 2/1971 | Miller . |
| 3,765,688 | 10/1973 | Junker ............................. 277/67 |
| 3,804,423 | 4/1974 | Booy ................................ 277/1 |
| 3,834,156 | 9/1974 | Cutler et al. . |
| 4,012,049 | 3/1977 | Lambrecht .................. 277/83 X |
| 4,065,136 | 12/1977 | Miller, Jr. .................. 277/168 X |
| 4,095,857 | 6/1978 | Palmer . |
| 4,101,241 | 7/1978 | Kasuya . |
| 4,107,927 | 8/1978 | Gordon, Jr. et al. . |

FOREIGN PATENT DOCUMENTS 48-26304 3/1973 Japan .

Primary Examiner—Robert I. Smith
Attorney, Agent, or Firm—Stuart O. Lowry; Joseph A. Yanny

[57] ABSTRACT

A shaft seal arrangement for turbochargers comprises a two piece wear washer for preventing passage of bearing lubricant into the turbocharger turbine housing. The two pieces of the wear washer seal respectively with the turbocharger shaft and with the turbocharger bearing housing. The two pieces of the wear washer further cooperate with each other to form a radially displaceable seal arrangement to accommodate radial excursions of the shaft without leakage of bearing lubricant.

20 Claims, 3 Drawing Figures

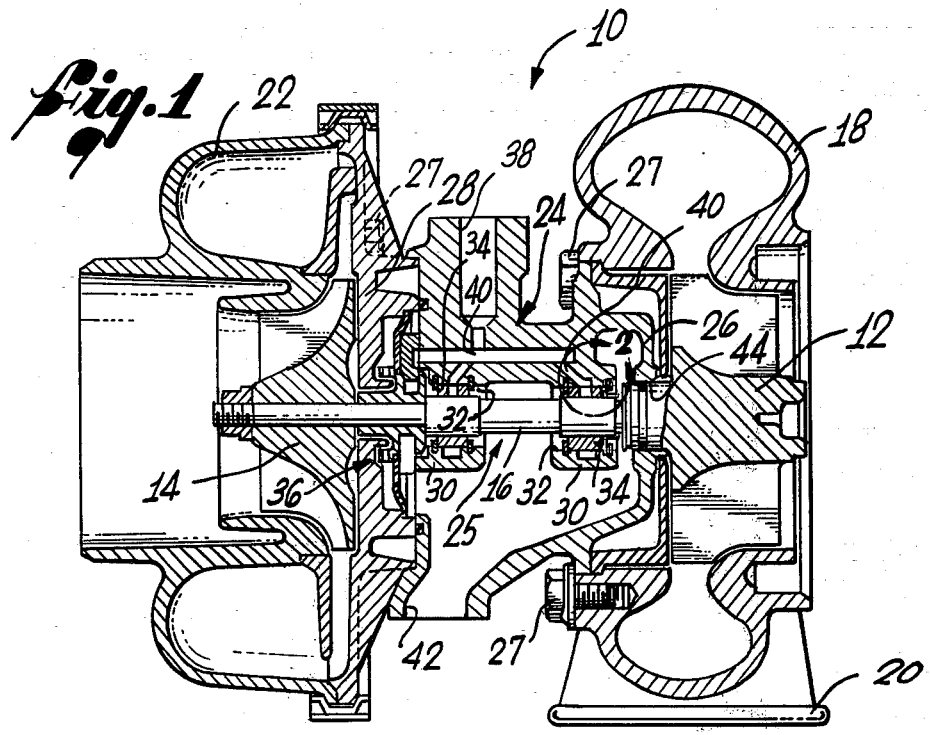
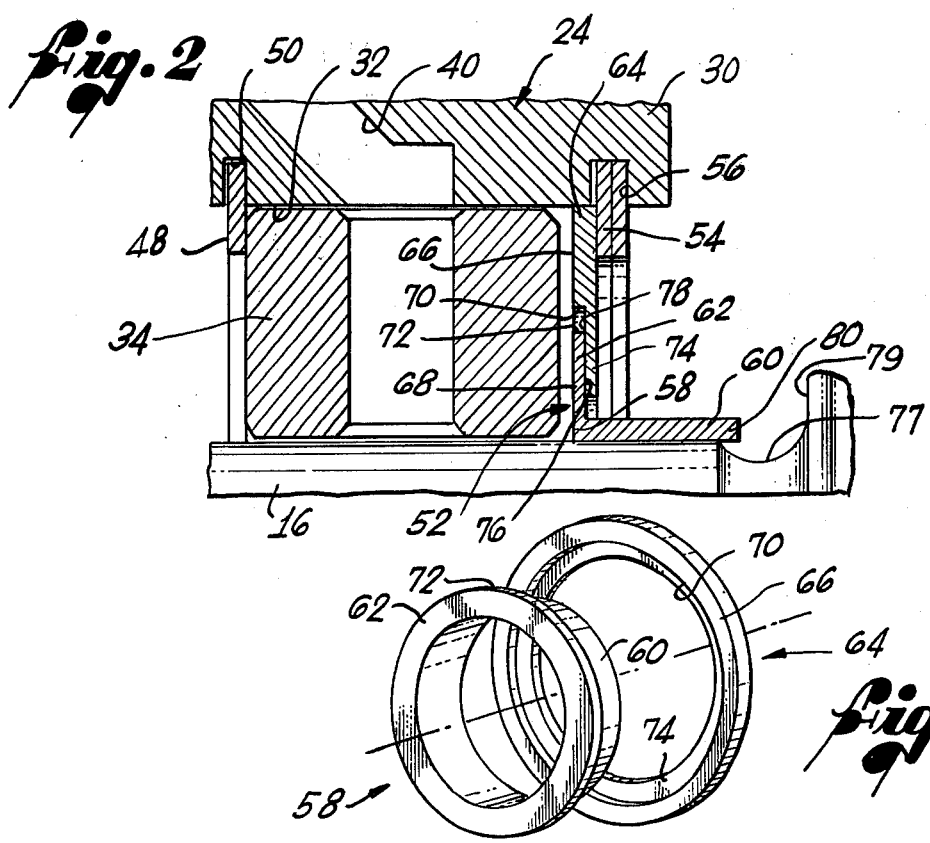

TURBOCHARGER SHAFT SEAL ARRANGEMENT

BACKGROUND OF THE INVENTION

This invention relates to turbocharger shaft seal arrangements. More specifically, this invention relates to an improved seal arrangement for the turbine end of a turbocharger shaft for preventing passage of bearing lubricants into the turbine housing.

Turbochargers in general are well known in the art, and typically comprise a turbine wheel and a compressor wheel mounted on a common shaft and carried respectively within turbine and compressor housings. These turbine and compressor housings are in turn mounted on a so-called center housing which rotatably carries and supports the common shaft within suitable bearings and provides lubricant guide passages for circulating sufficient lubricant to the bearings to prevent excessive heat and wear. Of course, during operation of the turbocharger, exhaust gases from an engine rotatably drive the turbine wheel which, in turn, rotatably drives the compressor wheel for supplying compressed charge air to the engine.

In turbochargers, it is important to provide relatively leak-free seals between the shaft bearings within the center housing and the rotating turbine and compressor wheels. This is particularly true at the turbine end of the shaft, since the turbine typically operates in a relatively high temperature environment. Accordingly, it is desirable to prevent leakage of bearing lubricant into the turbine housing to prevent gumming and/or coking of the lubricant which can detrimentally affect turbine performance. Moreover, partial ignition of the lubricant within the turbine housing can have adverse effects on the level of pollutants discharged to atmosphere by an engine system.

Many prior art seal arrangements have attempted to reduce or eliminate leakage of lubricant out of a turbocharger center housing. The majority of these techniques involve the inclusion of one or more seal rings received with close tolerances about the shaft for sealing passage of the shaft through a center housing side wall into either the turbine or compressor housing. See, for example, U.S. Pat. Nos. 1,900,849; and 2,890,069. Other seal arrangements have attempted to vent the seal within the center housing in an effort to allow lubricant contacting the seal to drain therefrom. See, for example, U.S. Pat. Nos. 3,565,497; 3,834,156; 4,101,241; 4,107,927; and Japanese Utility Model Publication No. 48-26204. Still other designs have included a slinger or the like on the shaft for pumping excess lubricant within the center housing radially away from a seal ring. See, for example, U.S. Pat. Nos. 1,463,018; 3,053,541; 3,494,679; and 4,095,857. Further design arrangements have included relatively complicated labyrinth-type seal or packing seal constructions which may be combined with slingers or the like to provide a lubricant barrier arrangement. See, for example, U.S. Pat. Nos. 1,211,166; 2,910,328; and 3,004,782. However, these various prior art seal arrangements have not proven totally satisfactory, particularly during those conditions of turbocharger operation wherein a positive pressure differential exists between the center housing and the turbine housing. When such a positive pressure differential exists, available prior art seals such as those discussed above have shown an annoying tendency to leak lubricant into the turbine housing even at relatively low pressure differentials. The leakage problem is compounded by the effects of commonly encountered radial excursions of the turbocharger shaft during operation which tend to cause rapid wear of conventional seal ring devices whereby the requisite close tolerances are destroyed resulting in increased lubricant leakage.

This invention overcomes the problems and disadvantages of the prior art by providing an improved turbocharger shaft seal arrangement for the turbine end of the shaft having substantially improved resistance to leakage of the lubricant into the turbine housing.

SUMMARY OF THE INVENTION

In accordance with the invention, a shaft seal arrangement is provided for a turbocharger comprising turbine and compressor wheels mounted on a common shaft, and respectively received within turbine and compressor housings. The common shaft is rotatably supported within a center housing mounted between the turbine and compressor housings. More specifically, the center housing includes opposed side walls for connection to the adjacent turbine and compressor housings and a central bearing boss or housing including a bearing bore for receiving suitable bearings for rotatably supporting the shaft. Conveniently, at least two sets of the bearings are provided within the center housing generally adjacent opposite ends of the shaft for providing stable shaft support.

At the turbine end of the shaft, a first or inner seal washer member is received with close tolerance over the shaft within the bearing bore for preventing passage of bearing lubricant in an outboard direction along the shaft between the shaft and the inner washer member. A second or outer washer member is received within the bearing bore in close tolerance within the bearing boss to prevent passage of bearing lubricant in an outboard direction between the boss and the outer washer member. The inner and outer washer members are positioned generally in radial alignment with each other, and include radially facing shoulders annularly spaced from each other to accommodate relative radial motion therebetween. The inner and outer washer members also include axially presented faces in sealing engagement with each other. An annular retaining spring is received within the bearing bore at the outboard side of the washer members to prevent axial displacement of said members away from the adjacent bearing.

In operation, the inner and outer washer members respectively prevent leakage of lubricant along the shaft and along the wall of the bearing boss. The washer members further prevent lubricant leakage at their interface by virtue of their axial faces maintained in leak-free engagement with each other.

Other features and advantages of the present invention will become apparent from the following detailed description, taken in conjunction with the accompanying drawings which illustrate by way of example the principles of the invention.

BRIEF DESCRIPTION OF THE DRAWINGS

The accompanying drawings illustrate the invention. In such drawings:

FIG. 1 is a fragmented elevation view of a turbocharger including the shaft seal arrangement of this invention;

FIG. 2 is an enlarged portion of FIG. 1 illustrating the seal arrangement of this invention; and FIG. 3 is an enlarged perspective view illustrating the seal members in exploded relationship.

DETAILED DESCRIPTION OF THE PREFERRED EMBODIMENT

A turbocharger 10 is shown in FIG. 1 and generally comprises a turbine wheel 12 and a compressor wheel 14 mounted on opposite ends of a common shaft 16. The turbine wheel 12 is disposed within a turbine housing 18 which includes an inlet 20 for receiving exhaust gases from an engine (not shown). The turbine housing 18 guides the engine exhaust gases into communication with and expansion through the turbine wheel 12 for rotatably driving the turbine wheel. Such driving of the turbine wheel simultaneously rotatably drives the compressor wheel 14 which is carried within a compressor housing 22. The compressor wheel 14 and housing 22 function to draw in and compress ambient air for supply to the intake of the engine as by suitable conduit means (not shown).

The turbine housing 18 and the compressor housing 22 are mounted upon an intermediate center housing 24 as by bolts 27 or the like. The center housing 24, as shown in FIG. 1, includes opposed side walls 26 and 28 for interfacing with the adjacent turbine and compressor housings 18 and 22, respectively. Moreover, the center housing 24 includes a bearing carriage 25 comprising a pair of bearing bosses 30 which are axially spaced from each other generally adjacent the opposite side walls 26 and 28. The bearing bosses 30 form bearing bores 32 for reception of suitable journal bearings 34 for rotatably receiving and supporting the shaft 16. Conveniently, as shown, a thrust bearing assembly 36 is also carried about the shaft 16, preferably adjacent the compressor side wall 28, for preventing axial excursions of the shaft 16. While the thrust bearing assembly 36 is not described in detail, a thrust bearing assembly construction generally along the lines of that disclosed in U.S. Pat. No. 3,494,679 is preferred.

Lubricant such as engine oil or the like is supplied via the center housing 24 to the journal bearings 34 and to the thrust bearing assembly 36. To this end, a lubricant inlet port 38 is formed in the center housing 24 and is adapted for connection to a suitable source of lubricant such as filtered engine oil. The port 38 communicates with a network of internal supply passages 40 which are suitably formed in the center housing 24 to direct the lubricant to the appropriate bearings. In this manner, excessive bearing wear and heating within the center housing is avoided to prolong turbocharger operating life. This lubricant circulated to the bearings is collected in a suitable sump or drain 42 for passage to appropriate filtering, cooling, and recirculation equipment, all in a well-known manner.

The invention of this application comprises an improved shaft seal arrangement for the turbine end of the turbocharger shaft 16. More specifically, the invention comprises an improved arrangement for preventing lubricant supplied to the bearing 34 at the turbine end of the shaft 16 from leaking along the shaft and into turbine housing 18. In the prior art, such leakage comprises a significant design problem in that the lubricant tends to readily pump through the shaft passage opening 44 in the side wall 26 whenever a positive pressure differential exists between the center housing interior and the turbine housing interior. That is, whenever the pressure within the housing 24 exceeds the pressure within the turbine housing 18, the lubricant is drawn from the adjacent bearing 34 along the shaft 16 and through the shaft opening 44.

The shaft seal arrangement of this invention is shown in more detail in FIG. 2. As shown, the bearing boss 30 adjacent the turbine side wall 26 carries an annular retaining ring 48 secured within an annular recess 50 at the inboard end of the bearing 34. A two piece annular wear washer 52 is received within the bearing boss 30 at the outboard end of the bearing 34 and this two piece wear washer 52 is axially retained adjacent the bearing by a spring-type annular retaining ring 54 secured within an annular recess 56 in the boss 30. Lubricant supplied to the bearing 34 via the supply passages 40 freely passes in an inboard direction along the inner and outer diameter surfaces of the bearing 24 for flow to the sump 42 at the inboard end of the bearing 34. Importantly, however, the two piece wear washer 52 at the outboard end of the bearing 34 substantially eliminates leakage of lubricant in the outboard direction and thereby serves to substantially prevent lubricant from leaking along the shaft 16 into the turbine housing 18.

The two piece wear washer 52 comprises a first or inner washer member 58 formed from a suitable wear resistant material such as stainless steel or the like. The inner washer member 58 comprises an annular ring having a generally L-shaped cross section to include an axially outboard extending leg 60 and a radially extending leg 62. As illustrated in FIG. 2, the axially extending leg 60 is sized for snug reception about the shaft 16 with a sufficiently close tolerance to substantially eliminate lubricant leakage between the inner washer member 58 and the shaft 16. The radially extending leg 62 projects radially outwardly from the shaft 16 and terminates approximately mid-way between the shaft and the inner diameter of the bore 32 of the boss 30.

The two piece wear washer 58 further includes a second or outer washer member 64 which is also formed from a suitable wear resistant material such as stainless steel or the like. This outer washer member 64 comprises an annular ring having an outer diameter sized for snug reception within the bearing boss 30 with a sufficiently close tolerance to substantially eliminate lubricant leakage between the outer washer member 64 and the bearing boss 30. Importantly, the outer washer member 64 is positioned in axial alignment with the radially extending leg 62 of the inner washer member 58 so that the outer and inner washer members 64 and 58 provide respective axially inboard presented faces 66 and 68 in a common radial plane to define a planar wear washer surface for running engagment with the outboard end of the bearing 34.

The outer washer member 64 includes a radially inwardly presented shoulder 70 which is axially aligned with and radially spaced from the peripheral surface or shoulder 72 of the radially extending leg 62 of the inner washer member 58. Accordingly, the inner and outer washer members 58 and 64 are radially movable with respect to each other without impairing the ability of either one to maintain a lubricant seal with the shaft 16 and the bearing boss 30, respectively. Moreover, as illustrated in FIGS. 2 and 3, the shoulders 70 and 72 have matching axial widths, and the outer washer member 64 further includes a seal leg 74 which projects radially inwardly in bearing engagement with the outboard face 76 of the radially extending inner washer member leg 62. Accordingly, the seal leg 74 provides an axially inboard face 78 in bearing sealing relation with the axially outboard face 76 of the inner washer member 58 to prevent leakage of lubricant between the inner and outer washer members 58 and 64.

The spring-type retaining ring 56 bears against the outboard side of the outer washer member 64 to maintain the two piece wear washer 52 in the desired axial position with respect to the bearing 34. This further maintains the inner and outer washer members 58 and 64 in sealing relation with respect to each other to substantially eliminate leakage of lubricant in an outboard direction along the shaft.

The shaft seal arrangement of this invention is particularly advantageous in that the two piece wear washer 52 provides a combination wear washer face for the bearing 34 and well as providing means for preventing leakage of lubricant into the turbine housing 18. The inner and outer washer members 58 and 64 remain in sealing relation in spite of radial shaft excursions during turbocharger operation.

In some applications, it can be desirable to form the tolerance fit between the axially extending leg 60 of the inner washer member 58 and the shaft 16 such that a relatively small lubricant flow between the leg 60 and the shaft 16 may occur. In that event, the shaft 16 can be provided with a conventional annular groove 77 together with an outboard positioned slinger 79 for pumping the relatively small lubricant flow radially away from the opening 44 (FIG. 1) in the adjacent side wall 26. As shown in FIG. 2, the pumping efficiency of the slinger 79 can be advantageously improved by extending the length of the axially extending leg 60 to terminate with a slight overhang 80 with respect to the recess 77. With this configuration, any such lubricant flow tends to leak along the leg 60 and fall from the overhang 80 into contact with the rapidly spinning shaft 16 within the recess 77 for pumping by means of the slinger 79.

A variety of modifications and improvements of the invention described herein are believed to be possible without varying from the scope thereof. Accordingly, no limitation the invention is intended by way of the foregoing description, except as set forth in the appended claims.

What is claimed is:

1. In a turbocharger having a center housing with a bearing bore receiving bearing means rotatably supporting a turbocharger shaft, and a turbine wheel mounted on said shaft within a turbine housing, a shaft seal arrangement for preventing leakage of bearing lubricant from the center housing into the turbine housing, comprising:
    a first annular seal member received about the shaft between the bearing means and the turbine housing for substantially preventing leakage of lubricant between said first seal member and the shaft;
    a second annular seal member received within the center housing generally in axial alignment with said first seal member for substantially preventing leakage of lubricant between said second seal member and the center housing; and
    said first and second seal members respectively including axially presented sealing faces in sealing bearing engagement with each other for substantially preventing leakage of lubricant between said seal members, said sealing faces being radially movable with respect to each other to accommodate radial excursions of the shaft and wherein said shaft includes slinger means defining an annular recess adjacent said seal members and a radially projecting flange adjacent the end of said recess opposite said seal members, said first seal member including an axially projecting leg extending along the shaft and terminating with a slight overhang annularly about said recess.

2. The shaft seal arrangement of claim 1 wherein said first seal member includes a radial leg projecting radially outwardly from the shaft to define a radially outwardly presented shoulder, an axially inboard face presented toward the bearing means, and an axially outboard face presented toward the turbine housing, and wherein said second seal member includes a radially inwardly presented shoulder in axial alignment with and radially spaced from said shoulder of said first seal member, and means forming an axially presented seal face for sealing bearing engagement with one of said axial faces of said first seal member for substantially preventing leakage of lubricant between said first and second seal members.

3. The shaft seal arrangement of claim 1 including means for maintaining said first and second seal members in sealing bearing engagement with respect to each other.

4. The shaft seal arrangement of claim 3 wherein said maintaining means comprises a retaining ring disposed between the turbine housing and said seal members.

5. The shaft seal arrangement of claim 4 wherein said retaining ring comprises a spring-type retaining ring.

6. The shaft seal arrangement at claim 1 wherein said seal members are disposed within the bearing bore adjacent the bearing means.

7. In a turbocharger having a center housing with a bearing bore receiving bearing means rotatably supporting a turbocharger shaft and a turbine wheel mounted on said shaft within a turbine housing, a shaft seal arrangement for preventing leakage of lubricant from the center housing into the turbine housing comprising:
    a first annular seal member received about the shaft between the bearing means and the turbine housing for substantially preventing leakage of lubricant between said first seal member and the shaft, said first seal member including a radially extending leg projecting radially outwardly to define a radially outwardly presented shoulder and a pair of oppositely presented axial faces; and
    a second annular seal member received within the center housing for substantially preventing leakage of lubricant between said second seal member and the center housing, said second seal member including a radially inwardly presented shoulder generally in axial alignment with and radially spaced from said shoulder of said first seal member, and means forming an axially presented seal face for sealing bearing engagement with one of said axial faces of said first seal member for substantially preventing leakage of lubricant between said first and second seal members.

8. The shaft seal arrangement of claim 7 wherein said second seal member includes an axially inboard face disposed generally in a plane common with the one of said axial faces of said first seal member presented toward the bearing means for defining together a wear surface for bearing engagement with the bearing means, and wherein said means forming an axially presented seal face comprises a seal leg projecting radially inwardly from said radially inwardly presented shoulder in sealing bearing engagement with the one of the axial faces of said first seal member presented toward the turbine housing.

9. The shaft seal arrangement of claim 7 including means for maintaining said first and second seal members in sealing bearing engagement with respect to each other.

10. The shaft seal arrangement of claim 7 wherein said shaft includes a slinger means defining an annular recess adjacent said seal members and a radially projecting flange adjacent the end of said recess opposite said seal members, said first seal member including an axially projecting leg extending along the shaft and terminating with a slight overhang annularly about said recess.

11. In a turbocharger having a center housing with a bearing bore receiving bearing means rotatably supporting a turbocharger shaft, and a turbine wheel mounted on said shaft within a turbine housing, a shaft seal arrangement for substantially preventing leakage of lubricant from the center housing into the turbine housing, comprising:
　a first annular seal member received about the shaft generally adjacent the bearing means and between the bearing means and the turbine housing for substantially preventing leakage of lubricant between said first seal member and the shaft, said first seal member including a radially outwardly projecting leg defining a radially outwardly presented shoulder, an axially inboard presented face forming a wear surface for engagement with the bearing means, and an axially outboard presented face; and
　a second annular seal member received within the center housing for substantially preventing leakage of lubricant between said second seal member and the center housing, said second seal member including a radially inwardly presented shoulder in axial alignment with and radially spaced from said shoulder of said first seal member, an axially inboard presented face in a plane generally common with the axially inboard presented face of said first seal member to form a wear surface for engagement with the bearing means, and a seal leg projecting radially inwardly from said radially inwardly presented shoulder in sealing bearing engagement with the axially outboard presented face of said first seal member for substantially preventing leakage of lubricant between said first and second seal members.

12. The shaft seal arrangement of claim 11 wherein said shaft includes slinger means defining an annular recess adjacent said seal members and a radially projecting flange adjacent the end of said recess opposite said seal members, said first seal member including an axially projecting leg extending along the shaft and terminating with a slight overhang annularly about said recess.

13. The shaft seal arrangement of claim 11 including means for maintaining said first and second seal members in sealing bearing engagement with respect to each other.

14. In a turbocharger having a center housing with a bearing bore receiving bearing means rotatably supporting a turbocharger shaft and a turbine wheel mounted on said shaft within a turbine housing, a shaft seal arrangement for substantially preventing leakage of lubricant from the center housing into the turbine housing, comprising:
　a first annular seal member received about the shaft generally adjacent the bearing means and between the bearing means and the turbine housing for substantially preventing leakage of lubricant between said first seal member and the shaft, said first seal member including an axial leg received about the shaft and a radial leg projecting radially outwardly from the end of said axial leg adjacent the bearing means to define a radially outwardly presented shoulder, an axially inboard presented face forming a wear surface for engagement with the bearing means, and an axially outboard presented face;
　a second annular seal member received within the center housing for substantially preventing leakage of lubricant between said second seal member and the center housing, said second seal member including a radially inwardly presented shoulder in axial alignment with and radially spaced from said shoulder of said first seal member, an axially inboard presented face in a plane generally common with the axially inboard presented face of said first seal member to form a wear surface for engagement with the bearing means, and a seal leg projecting radially inwardly from said radially inwardly presented shoulder in sealing bearing engagement with the axially outboard presented face of said first seal member for substantially preventing leakage of lubricant between said first and second seal members; and
　slinger means on the shaft between said first seal member and the turbine housing, said slinger means including an annular recess on the shaft adjacent said first seal member and a radially extending flange at the outboard end of said recess, said axial leg of said first seal member terminating at its outboard end with a slight overhang annularly about said recess.

15. The shaft seal arrangement of claim 14 including a retaining ring disposed between the turbine housing and said second seal member for axially securing said seal members in sealing bearing engagement with each other.

16. The shaft seal arrangement of claim 15 wherein said retaining ring comprises a spring-type retaining ring.

17. In a turbocharger having a center housing with a bearing bore receiving bearing means rotatably supporting a turbocharger shaft and a turbine wheel mounted on said shaft within a turbine housing, a method of substantially preventing leakage of bearing lubricant from the center housing into the turbine housing, comprising the steps of:
　mounting a first annular seal member about the shaft between the bearing means and the turbine housing with a sufficiently close tolerance for substantially preventing leakage of lubricant between the first seal member and the shaft;
　mounting a second annular seal member within the center housing generally in alignment with the first seal member and with a sufficiently close tolerance for substantially preventing leakage of lubricant between the second member and the center housing;
　maintaining the first and second seal members in axially sealing bearing relation with each other for allowing relative radial movement therebetween while substantially preventing leakage of lubricant between the seal members; and
　forming the seal members to have oppositely presented radial shoulders generally of common axial width and radially spaced from each other.

18. The method of claim 17 wherein the shaft includes slinger means defining an annular recess adjacent the seal members and a radially prejecting flange at the end of the recess adjacent the turbine housing, and including the step of forming the first seal member to include an axial leg terminating in a slight overhang annularly about the recess.

19. In a turbocharger having a center housing with a bearing bore receiving bearing means rotatably supporting a turbocharger shaft, and a turbine wheel mounted on said shaft within a turbine housing, a shaft seal arrangement for preventing leakage of bearing lubricant from the center housing into the turbine housing, comprising:

a first annular seal member received about the shaft between the bearing means and the turbine housing for substantially preventing leakage of lubricant between said first seal member and the shaft including a radial leg projecting radially outwardly from the shaft to define a radially outwardly presented shoulder, an axially inboard face presented toward the bearing means, and an axially outboard face presented toward the turbine housing; and a second annular seal member received within the center housing generally in axial alignment with said first seal member for substantially preventing leakage of lubricant between said second seal member and the center housing including a radially inwardly presented shoulder in axial alignment with and radially spaced from said shoulder of said first seal member, and seal leg means projecting radially inwardly from said radially inwardly presented shoulder to form an axially presented inboard seal face for sealing bearing engagement with one of said axial faces of said first seal member for substantially preventing leakage of lubricant between said first and second seal members;

said sealing faces being radially movable with respect to each other to accommodate radial excursions of the shaft wherein said second seal member includes an axially inboard face disposed generally in a plane common with the axially inboard face of said first seal member for defining together a wear surface for bearing engagement with the bearing means.

20. In a turbocharger having a center housing with a bearing bore receiving bearing means rotatably supporting a turbocharger shaft and a turbine wheel mounted on said shaft within a turbine housing, a method of substantially preventing leakage of bearing lubricant from the center housing into the turbine housing, comprising the steps of:

mounting a first annular seal member about the shaft between the bearing means and the turbine housing with a sufficiently close tolerance for substantially preventing leakage of lubricant between the first seal member and the shaft;

mounting a second annular seal member within the center housing generally in alignment with the first seal member and with a sufficiently close tolerance for substantially preventing leakage of lubricant between the second member and the center housing;

maintaining the first and second seal members in axially sealing bearing relation with each other for allowing relative radial movement therebetween while substantially preventing leakage of lubricant between the seal members; and forming the seal members to have respective axial faces in a common plane presented toward the bearing means to define a wear surface for engagement with the bearing means.

* * * * *